3,140,168
REDUCTION OF IRON ORE WITH HYDROGEN
James W. Halley, Dune Acres, and John E. McConnell, Gary, Ind., assignors to Inland Steel Company, Chicago, Ill., a corporation of Delaware
Filed May 31, 1961, Ser. No. 113,817
8 Claims. (Cl. 75—11)

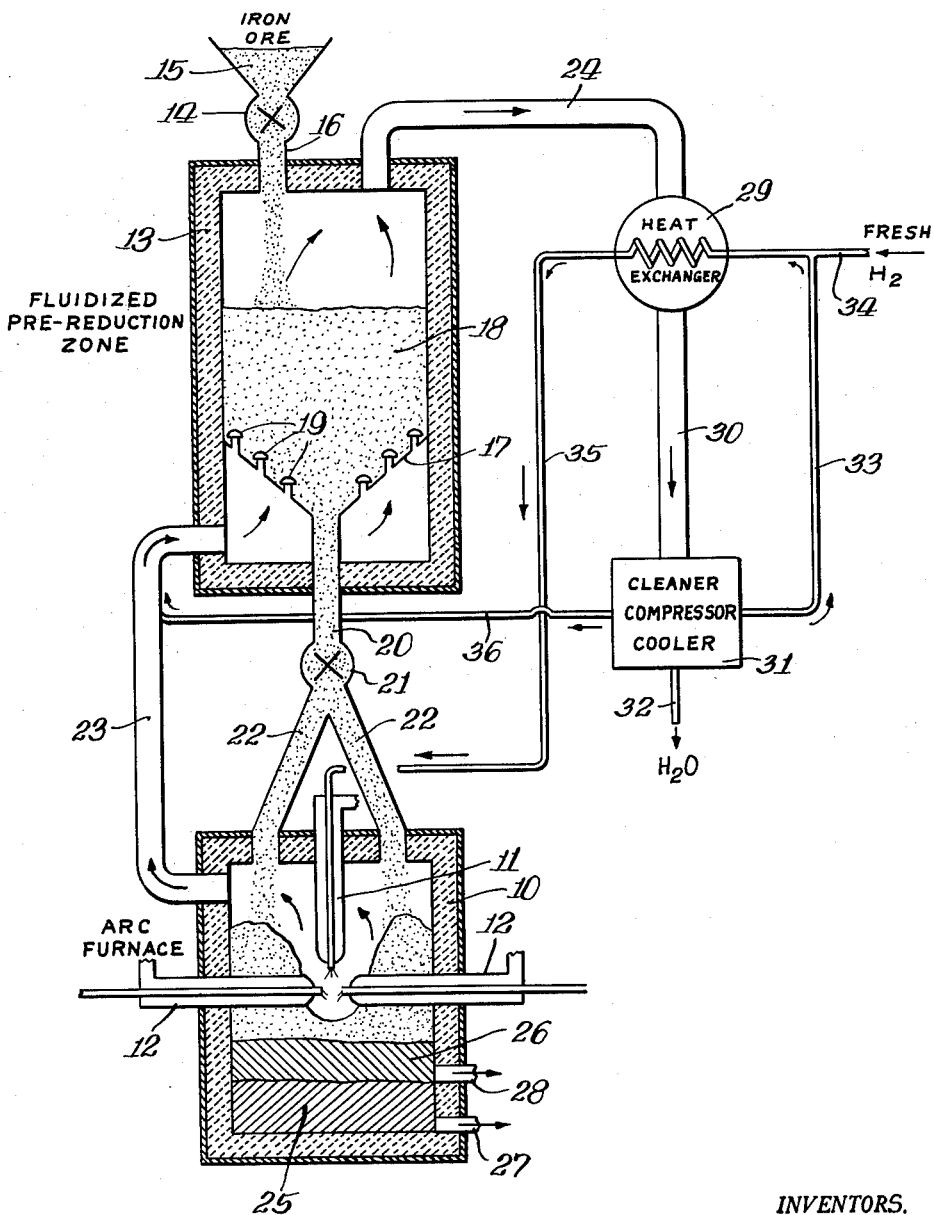

This invention relates to the reduction of an iron oxide ore with hydrogen and more particularly to a novel combined reduction and melting process for producing molten iron from an iron oxide ore.

Many different processes have been proposed for the reduction of iron ores with hydrogen or a hydrogen-rich reducing gas. However, such processes for the most part yield a final product in solid form comprising a mixture of metallic iron and gangue and commonly referred to as sponge iron or synthetic scrap. These previously known processes for the reduction of iron ore using a hydrogen gas as the reducing agent have not been feasible for the production of molten iron as the final product and have generally been carried out at relatively low temperatures because of the difficulty of containing hydrogen at high temperatures. Furthermore, it is impossible to supply the heat requirements for both the reduction and melting steps merely by heating the hydrogen gas.

Accordingly, it is a primary object of the present invention to provide a novel process for the utilization of gaseous hydrogen in the reduction of an iron oxide ore.

Another object of the invention is to provide a novel process of the above-mentioned type in which an electric arc is utilized.

A further object of the invention is to provide a novel electric arc process of the foregoing type wherein the thermal and chemical requirements of the process are balanced with minimum energy consumption.

Other objects and advantages of the invention will become evident from the subsequent detailed description taken in conjunction with the accompanying drawing which is a schematic diagram showing one method of practicing the invention.

Briefly described, the invention comprises thermally decomposing molecular hydrogen, e.g., by an electric arc, in a combined reduction and melting zone to which subdivided iron oxide ore is fed. By the action of the electric arc the molecular hydrogen is broken down into atomic hydrogen which, together with undecomposed molecular hydrogen, effects reduction of the iron oxide ore. However, part of the atomic hydrogen recombines to form molecular hydrogen with the evolution of large amounts of heat which, together with the heat of radiation from the electric arc, causes melting of the reduced iron ore to form molten iron and slag. The effluent molecular hydrogen from the combined reduction and melting zone is passed through a separate pre-reduction and preheating zone wherein the fresh iron ore is preheated and partially reduced by the action of the molecular hydrogen. Water is removed from the used reducing gas, by condensation or otherwise, and part of the resultant dry gas stream is recycled directly to the pre-reduction and preheating zone. The remainder of the stream is combined with fresh molecular hydrogen and recycled to the electric arc in the combined reduction and melting zone. Preferably, the last-named combined stream is heat exchanged with the effluent stream from the pre-reduction and preheating zone.

Referring now to the drawing, a refractory lined chamber 10 comprises the main reduction and melting zone and is provided with a water cooled hydrogen lance or feed nozzle 11 and a pair of water cooled electrodes 12 adapted to be connected to a suitable electrical energy source (not shown). The electrodes 12 may comprise any of the usual materials, such as carbon, graphite, tungsten or the like, commonly employed in electric arc furnaces. A refractory lined chamber 13 is disposed above the chamber 10 and comprises the pre-reduction and preheating zone. A feeding device such as a star feeder 14 is provided for controllably feeding subdivided iron oxide ore from a hopper 15 or other supply source through an inlet 16 to the chamber 13.

The ores which may be used in the process comprise any of the well known iron ores including hematite, magnetite, and others which may contain from about 5 to about 45 weight percent gangue materials, particularly silica and alumina. It is also within the scope of the invention to charge other iron oxide materials such as mill scale or other ores similar to iron ore such as iron-manganese ores. The particle size of the subdivided iron ore is not particularly critical and may range from about 100 mesh to as large as ½". Thus, the process is not handicapped by a minimum particle size requirement such as in the conventional blast furnace and the invention is, therefore capable of utilizing various finely divided iron ore concentrates, such as taconite, without the necessity for a sintering operation.

The chamber 13 has a cone-shaped partition or false bottom 17 for supporting a bed of iron ore 18. The partition 17 includes a plurality of protected gas inlets, such as the bubble cap type elements indicated at 19, through which gas may pass upwardly through the bed 18 while solid particles are prevented from passing downwardly. An ore feed pipe 20 extends from the bottom of the cone-shaped partition 17 and iron ore is transferred at a controlled rate by a star feeder 21 or similar device through one or more branch conduits 22 into the top of the chamber 10. Effluent gas from the chamber 10 passes through a conduit 23 to the lower end of the chamber 13.

In practicing the process, the subdivided or granular iron oxide ore is fed from the hopper 15 into the upper end of the chamber 13 and is withdrawn downwardly through the discharge pipe 20. As the iron ore moves downwardly, it is contacted countercurrently with hydrogen gas introduced through the conduit 23, the hydrogen gas passing upwardly through the passages 19 in the partition 17 and through the bed 18 and finally being removed through a conduit 24 at the top of the chamber 13. Preferably, the operating conditions in the chamber 13 are regulated to provide a fluidized bed 18 inasmuch as the allowable temperature gradient between inlet and outlet streams is greater for a fluidized bed operation. The temperature of the fluidized bed may be from about 1050° F. to about 1500° F., but preferably the range is from about 1050° F. to about 1300° F. in order to avoid the hazard of sticking or sintering of the bed at higher temperatures. It will be recognized that the degree of difficulty due to sticking or sintering of the ore will depend to a large extent on the particular type of ore being processed.

The preheated and partially reduced iron ore is transferred from the chamber 13 by the feeder 21 through the inlets 22 into the upper end of the main reduction and melting chamber 10. Gaseous molecular hydrogen is injected through the lance 11 into the electric arc zone between the electrodes 12 and under the influence of the high temperature of the electric arc the molecular hydrogen is thermally decomposed, at least in part, into atomic hydrogen. The reduction of the partially reduced iron ore is rapidly completed by the atomic and molecular hydrogen in the chamber 10 and at the same time the reduced iron and gangue constituents of the ore are melted to form a molten iron bath 25 and a fluid slag layer 26 which may be withdrawn through outlets 27 and 28, respectively. The action of the atomic hydrogen in reducing the iron oxide in the chamber 10 takes place at a much greater rate than reduction with molecular hydrogen, as for example takes place in the chamber 13. Although the molecular hydrogen is thermally decomposed at the high temperature of the electric arc, only part of the resultant atomic hydrogen is utilized in the reduction of the iron ore and the remaining atomic hydrogen immediately recombines to form molecular hydrogen with the evolution of heat. Thus, melting of the reduced iron ore is effected not only by the heat of radiation from the electric arc but also by the exothermic heat of reaction during recombination of atomic hydrogen to form molecular hydrogen.

As the amount of atomic hydrogen formed in the arc zone increases above a certain minimum value, it is found that an excess of heat is available beyond the melting requirements of the hearth. Consequently, in order to avoid such excess heat the decomposition of molecular hydrogen is preferably controlled by correlating the input of electrical energy at the arc and the hydrogen feed rate so as to obtain from about 5% to about 25% atomic hydrogen.

The effluent reducing gas from the chamber 10, comprising molecular hydrogen and water vapor at a temperature of from about 1900° F. to about 3000° F., passes through the line 23 to the chamber 13 and then passes countercurrently through the iron oxide bed 18 to effect preheating of the latter and preliminary or partial reduction of the iron oxide ore by the action of the molecular hydrogen. Thus, the effluent reducing gas removed through the line 24 contains additional quantities of water vapor as a result of the further reduction of iron oxide taking place in the chamber 13. The gas stream at this point is substantially saturated with water vapor and may be at a temperature of from about 1050° F. to about 1500° F. The gas is passed from the line 24 through a heat exchanger 29 and thence through a line 30 to a cleaning, compressing, and cooling zone, indicated schematically at 31, where water vapor is condensed to liquid form and is removed, as at 32.

Dependent upon the extent of reduction of iron oxide in the pre-reduction chamber 13, the energy and gas requirements for the pre-reduction step will vary with the operating temperature of the fluidized bed. For a given degree of reduction, the temperature of the fluidized bed determines the minimum volume of gas required to accomplish the desired reduction. For any specific temperature, the top gas leaving the pre-reduction chamber 13 through line 24 is in equilibrium with the reduction reaction and as a result of this equilibrium condition the required hydrogen input to the pre-reduction chamber 13 exceeds the stoichiometric quantity of hydrogen. Consequently, the top gas from the pre-reduction zone contains excess hydrogen which must be recycled for most economical operation of the process. Furthermore, this top gas contains substantial excess heat which, if regained, can help to minimize the energy requirements of the process.

Accordingly, dry hydrogen gas from the water removal stage 31 is passed through a line 33, combined with fresh molecular hydrogen introduced through a line 34, and recycled through the heat exchanger 29 and a line 35 to the water-cooled lance or feed nozzle 11 in the arc furnace 10. By thus heat exchanging the hydrogen input to the arc furnace with the top gas from the pre-reduction step, the thermal energy load on the arc furnace is decreased and the over-all energy requirements of the process are minimized.

However, as pointed out above, whe have found that when the operating temperature in the fluidized pre-reduction chamber 13 is within the preferred range of from about 1050° F. to about 1300° F., the minimum gas requirements to satisfy the aforementioned top gas equilibrium conditions are such that the total hydrogen requirements exceed the input hydrogen to the arc furnace 10 required to meet the thermal load of the pre-reduction chamber 13. Hence, in order to operate the process efficiently with the thermal and chemical requirements of the arc furnace and the pre-reduction zone in balance, it is essential that only part of the top gas be recycled to the arc furnace 10 in the manner already described. The balance of the top gas must be recycled directly to the pre-reduction zone 13 in order to reduce the energy load in the arc furnace 10. Thus, the remainder of the dry hydrogen gas from the water removal stage 31 is returned through a line 36 to the line 23 and thence into the pre-reduction zone 13.

Although superatmospheric pressures may be employed, the process is most conveniently carried out at substantially atmospheric pressure or slightly above in both chambers 10 and 13.

If desired, carbon may be added in any convenient form, such as coke, coal, or graphite, to the molten metal in the chamber 10 in order to effect carburization of the molten iron to yield a product of desired carbon content. By suitable operation of the feeding devices 14 and 21 and by withdrawing the molten products through the outlets 27 and 28 in an appropriate manner, a substantially continuous operation of the process is readily obtained. As indicated in the drawing, the partially reduced solid iron ore may accumulate to some extent in the main reduction and melting chamber 10 and is gradually acted upon by the electric arc and hydrogen in the manner described so as to convert the iron ore to molten iron and slag. However, it will be understood that this illustration is largely schematic for the purpose of understanding the invention, and other feeding arrangements and relative locations of the electrodes and hydrogen lance may be utilized so that the iron ore is converted to molten iron and slag almost as rapidly as it is fed to the chamber 10.

A primary advantage of the process is the ability to obtain a very high throughput in a relatively small apparatus as a result of the high concentration of heat in the arc zone of the hearth.

The following specific example is illustrative of the results obtainable by the present invention:

*Example*

In an apparatus of the type shown in the drawing operated at substantially atmospheric pressure the pre-reduction chamber 13 has charged thereto pulverized iron oxide ore comprising, on a weight percent basis, 60% Fe, 6% $SiO_2$ and 4% $Al_2O_3$. The ore is preheated to a temperature of about 1270° F. Molecular hydrogen is fed to the lance 11 at about 1200° F. and in an amount of about 36,650 s.c.f. per ton of iron produced. The input of electrical energy at the electrodes 12 is about 1100 kilowatt-hours per ton of iron produced. The molecular hydrogen is decomposed to yield about 25% atomic hydrogen.

Partially spent reducing gas comprising 62 mol percent $H_2$ and 38 mol percent $H_2O$ is withdrawn from the hearth-reduction chamber 10 through the line 23 at a temperature of about 2786° F. and is introduced into the pre-reduction chamber 13. The partially reduced iron ore is withdrawn from the pre-reduction chamber 13 through the line 20 and is introduced into the hearth-reduction chamber 10 at a temperature of about 1270° F.

Top gas comprising about 47 mol percent $H_2$ and about 53 mol percent $H_2O$ is removed from the pre-reduction chamber 13 through the line 24 at a temperature of about 1270° F. and in an amount equivalent to about 18,220 s.c.f. of $H_2$ per ton of iron produced. The top gas is heat exchanged in zone 29 with input $H_2$ comprising fresh $H_2$ from line 34 in an amount of about 20,250 s.c.f. per ton of iron produced and recycle $H_2$ from line 33 in an amount of about 16,400 s.c.f. per ton of iron produced.

Thus, the consumption of $H_2$ in the process is about 20,250 s.c.f. per ton of iron. The temperature of the preheated input $H_2$ as introduced to the lance 11 through line 35 is about 1200° F. The balance of the $H_2$ from the top gas is returned through line 36 at a temperature of about 77° F. in an amount of about 1820 s.c.f. per ton of iron produced so that the combined gas stream introduced into chamber 13 from lines 36 and 23 comprises about 38,470 s.c.f. of $H_2$ per ton of iron produced at a temperature of about 2690° F.

Slag is withdrawn from the chamber 10 at a temperature of about 3300° F. and molten iron is also removed at a temperature of about 2912° F. with an analysis of 98 wt. percent Fe and 2 wt. percent Si.

Although the invention has been described with particular reference to a certain specific embodiment thereof, it will be understood that various modifications and alternatives may be resorted to without departing from the scope of the invention as defined in the appended claims.

We claim:

1. An iron ore reduction process which comprises reacting iron oxide or in a first step with a hydrogen-containing gas under conditions to effect partial reduction of the ore, effecting thermal decomposition of molecular hydrogen in a second step to obtain atomic hydrogen, supplying partially reduced ore from the first step to said second step and reacting the same with a part of said atomic hydrogen to obtain iron, said iron being melted in said second step by the heat supplied for said thermal decomposition and by the heat evolved during recombination of the remainder of said atomic hydrogen to form molecular hydrogen, passing hydrogen-containing gas from said second step to said first step, withdrawing excess hydrogen from said first step, combining part of said excess hydrogen with fresh hydrogen and supplying the same to said second step, and recycling the remainder of said excess hydrogen to said first step.

2. An iron ore reduction process which comprises the steps of maintaining an electric arc in a combined reduction and melting zone, feeding iron oxide ore through a pre-reduction zone and thence into said combined reduction and melting zone in close proximity to said arc, introducing molecular hydrogen into said combined reduction and melting zone and thermally decomposing the same by means of said arc to form atomic hydrogen, the iron oxide fed to said combined reduction and melting zone being reduced by a part of said atomic hydrogen and the resultant reduced iron being melted by the heat of said arc and by the heat evolved during recombination of the remainder of said atomic hydrogen to form molecular hydrogen, withdrawing from said combined reduction and melting zone a gaseous stream comprising molecular hydrogen and water, passing said stream through said pre-reduction zone in contact with the iron oxide ore fed to said pre-reduction zone for preheating and partially reducing the fresh ore, treating the effluent gas stream from said pre-reduction zone to effect removal of water therefrom, adding fresh molecular hydrogen to a portion of the treated gas stream and recycling the resultant stream to said combined reduction and melting zone, and recycling the remainder of said treated gas stream to said pre-reduction zone.

3. The process of claim 2 further characterized in that water is removed from said effluent gas stream by cooling and condensation.

4. The process of claim 2 further characterized by the step of correlating the input of electrical energy to said arc in said combined reduction and melting zone with the hydrogen feed rate to said combined reduction and melting zone so as to obtain from about 5% to about 25% atomic hydrogen whereby to avoid an excess of heat in said combined reduction and melting zone.

5. The process of claim 2 further characterized in that said iron oxide ore is maintained as a fluidized bed in said pre-reduction zone at a temperature of from about 1050° F. to about 1500° F.

6. The process of claim 5 further characterized in that said temperature is from about 1050° F. to about 1300° F.

7. A balanced process for reducing iron oxide ore and melting the reduced iron wherein the chemical and thermal requirements of the process are supplied with minimum energy consumption, said process comprising: maintaining an electric arc in a combined reduction and melting zone; feeding iron oxide ore through a pre-reduction zone and thence into said combined reduction and melting zone in close proximity to said arc; introducing a first stream comprising molecular hydrogen, obtained as described below, into said combined reduction and melting zone and thermally decomposing the same by means of said arc to form atomic hydrogen, the iron oxide fed to said combined reduction and melting zone being reduced by a part of said atomic hydrogen and the resultant reduced iron being melted by the heat of said arc and by the heat evolved during recombination of the remainder of said atomic hydrogen to form molecular hydrogen; passing a second stream comprising hydrogen-containing gas from said combined reduction and melting zone through said pre-reduction zone in contact with the iron oxide fed thereto under conditions to maintain a fluidized bed of ore therein at a temperature of from about 1050° F. to about 1300° F. whereby to preheat and partially reduce the fresh ore; withdrawing from said pre-reduction zone top gas comprising water and excess unreacted hydrogen; removing water from said top gas; and thereafter combining part of said top gas with fresh hydrogen to form said first stream and introducing the remainder of said top gas, along with said second stream, into said pre-reduction zone whereby to decrease the thermal load on said combined reduction and melting zone while at the same time supplying the thermal and gas requirements of said pre-reduction zone.

8. The process of claim 7 further characterized in that said top gas is heat exchanged with said first stream for preheating the latter prior to introduction into said combined reduction and melting zone whereby the thermal load on said zone is further decreased.

References Cited in the file of this patent

UNITED STATES PATENTS

| | | |
|---|---|---|
| 1,715,155 | Westberg | May 28, 1929 |
| 2,226,525 | Dolan | Dec. 24, 1940 |
| 2,303,973 | Armstrong | Dec. 1, 1942 |
| 2,555,507 | Pratt | June 5, 1951 |
| 2,997,383 | Whaley | Aug. 22, 1961 |